United States Patent [19]
Barcza

[11] Patent Number: 5,141,154
[45] Date of Patent: Aug. 25, 1992

[54] VARIABLE THROAT CONVERGENT/DIVERGENT NOZZLE

[75] Inventor: William K. Barcza, Stuart, Fla.

[73] Assignee: United Technologies Corporation, Hartford, Conn.

[21] Appl. No.: 688,771

[22] Filed: Apr. 22, 1991

[51] Int. Cl.⁵ .......................... B64C 9/38; F02K 1/06
[52] U.S. Cl. ..................... 239/127.3; 239/265.19; 239/265.39; 60/266; 60/271
[58] Field of Search ............ 239/127.1, 127.3, 265.19, 239/265.33, 265.35, 265.37, 265.39, 265.41; 60/266, 271

[56] References Cited

U.S. PATENT DOCUMENTS

| | | | |
|---|---|---|---|
| 3,214,904 | 11/1965 | Bailey et al. | 239/265.41 |
| 3,367,579 | 2/1968 | Mehr | 239/265.39 |
| 3,386,658 | 6/1968 | Mehr | 60/271 |
| 3,972,475 | 8/1976 | Nelson et al. | 239/127.3 |
| 3,979,065 | 9/1976 | Madden | 239/127.3 |
| 4,043,509 | 8/1977 | McHugh et al. | 60/271 |
| 4,074,523 | 2/1978 | Holler et al. | 239/127.3 |
| 4,081,137 | 3/1978 | Sutton et al. | 239/127.3 |
| 4,196,856 | 4/1980 | James | 239/265.39 |
| 4,203,286 | 5/1980 | Warburton | 60/266 |
| 4,544,098 | 10/1985 | Warburton | 239/265.41 |
| 4,643,356 | 2/1987 | Holler et al. | 239/127.3 |

*Primary Examiner*—Andres Kashnikow
*Assistant Examiner*—Christopher G. Trainor
*Attorney, Agent, or Firm*—Edward L. Kochey, Jr.

[57] ABSTRACT

Each convergent flap and seal has a cantilevered extension deflector. This deflector reduces the throat area at minimum throat area, and seals against a divergent flap or seal in the maximum throat area position.

Cooling ambient air is induced through openings in the upstream portion of each divergent seal at intermediate throat areas. At minimum throat area the divergent flaps block these openings. At maximum throat area the deflectors block the cooling airflow path.

4 Claims, 6 Drawing Sheets

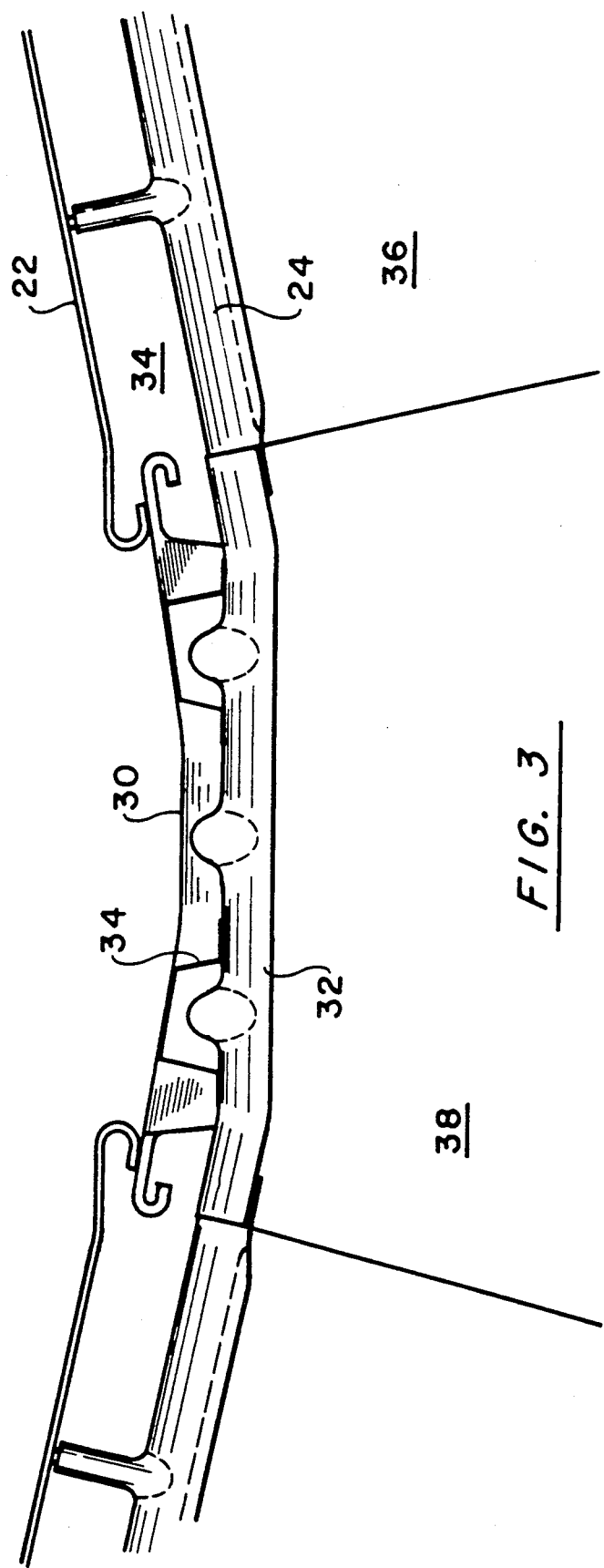

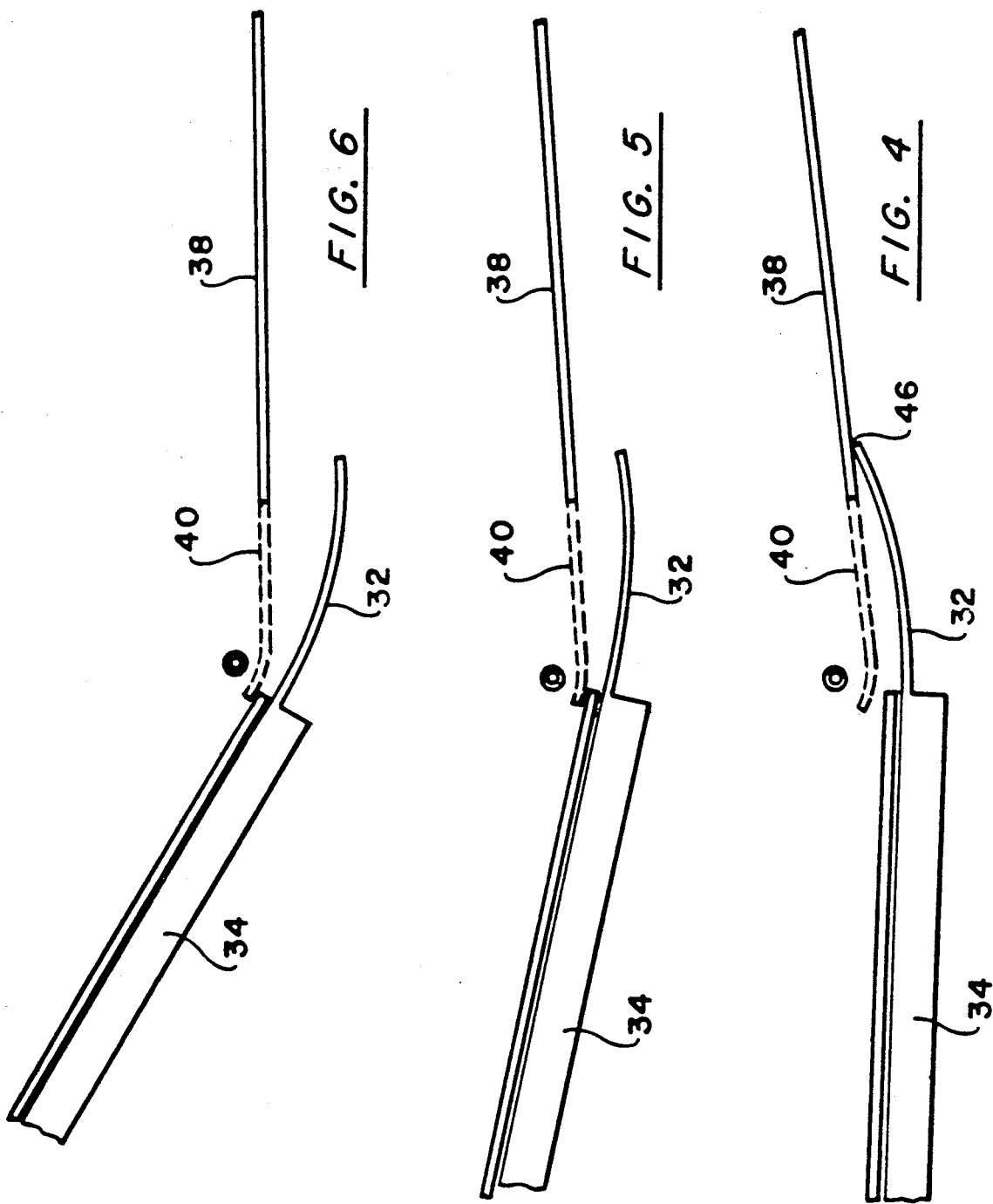

VARIABLE THROAT CONVERGENT/DIVERGENT NOZZLE

The government has rights in this invention pursuant to a contract awarded by the Department of the Air Force.

DESCRIPTION

1. Technical Field

The invention relates to convergent/divergent nozzles for aircraft and in particular to variable throat area nozzles for use with augmentors.

2. Background of the Invention

Maximum thrust and operating efficiency of a gas turbine engine is achieved when the engine exhaust passes through an exhaust nozzle which controls the expansion of the exhaust gases. Maximum operating efficiency generally requires that the nozzle be configured to exit the exhaust stream at substantially the same pressure as the surrounding ambient atmosphere.

With aircraft operating both at subsonic and supersonic speed the exhaust nozzle pressure ratio varies over a wide range. Variable throat convergent/divergent nozzles are used to achieve proper operation for the various operating conditions.

Engine pressure ratio and turbine temperature can be beneficially traded as fan stability margin is increased. In order to use this margin smaller minimum area settings are required. It would be helpful if a smaller minimum area could be achieved without increasing the kinematic requirements to vary the nozzle area.

These gas turbine engine nozzles operate with gas at an extremely high temperature level such that cooling of the nozzle surfaces is required. A known method includes passing a forced flow of cooling air through a liner which is lining both the convergent flaps and the convergent seals. This cooling flow is then dumped at the throat adjacent to the surface of the divergent section to film cool that section.

Various amounts of cooling air are required to properly cool the divergent section at various operating conditions. In accordance with conventional practice however the air flow is established based on the maximum airflow which is required under the most adverse condition. This forced air flow continues to operate at other conditions where the full amount is not required for cooling. This excess use of cooling air takes air away from the combustor and gas turbine thereby decreasing the efficiency of the engine.

SUMMARY OF THE INVENTION

A variable throat nozzle is operated with different openings under different operating conditions. For operation without augmentation the minimum flow area is used. The maximum area is used for operation with augmentation when at high altitude. With augmentation at sea level and low altitude the nozzle operates with intermediate area.

The maximum gas temperature is experienced when operating with augmentation at sea level and low altitudes. In accordance with conventional practice this would dictate the forced air cooling requirement. In accordance with the invention however the forced flow cooling requirement is reduced to the maximum air requirement at either augmentation at high altitude or for operation without augmentation. The pressure level just after the throat of the nozzle is below ambient pressure during operation with augmentation at sea level and low altitudes. At these conditions provision is made to permit cooling air flow to be induced for film cooling the divergent flaps and seals.

Operation without augmentation as well as operation with augmentation at high altitudes can produce a positive pressure downstream of a throat. Accordingly the induced air flow opening is closed whenever the throat area is at either the maximum or minimum position.

Cantilevered extension deflectors are secured to the downstream edge of both the convergent flaps and the convergent seals. At the minimum throat area position the extension of these deflectors decreases the minimum area, without increasing the kinematic drive requirements. These diverters are located and shaped so that they are in contact with the divergent flaps and seals in the maximum flow area position.

Openings in the divergent seal permit an induced air flow from the ambient plenum surrounding the nozzle for cooling of the divergent sections whenever they are exposed. They are located at the upstream end of the seals at a point upstream of where the deflectors contact the divergent sections. Accordingly, at the maximum flow area position these openings are blocked by the deflectors.

The openings in the divergent seal are also arranged in conjunction with the overlapping divergent flaps that so that at the minimum flow area condition the divergent flaps block the induced air flow path.

BRIEF DESCRIPTION OF THE DRAWINGS

FIG. 3 is a section at the throat area looking forward;

FIGS. 4, 5 and 6 are schematic views showing the operation of the deflector.

DESCRIPTION OF THE PREFERRED EMBODIMENT

Figure 1:
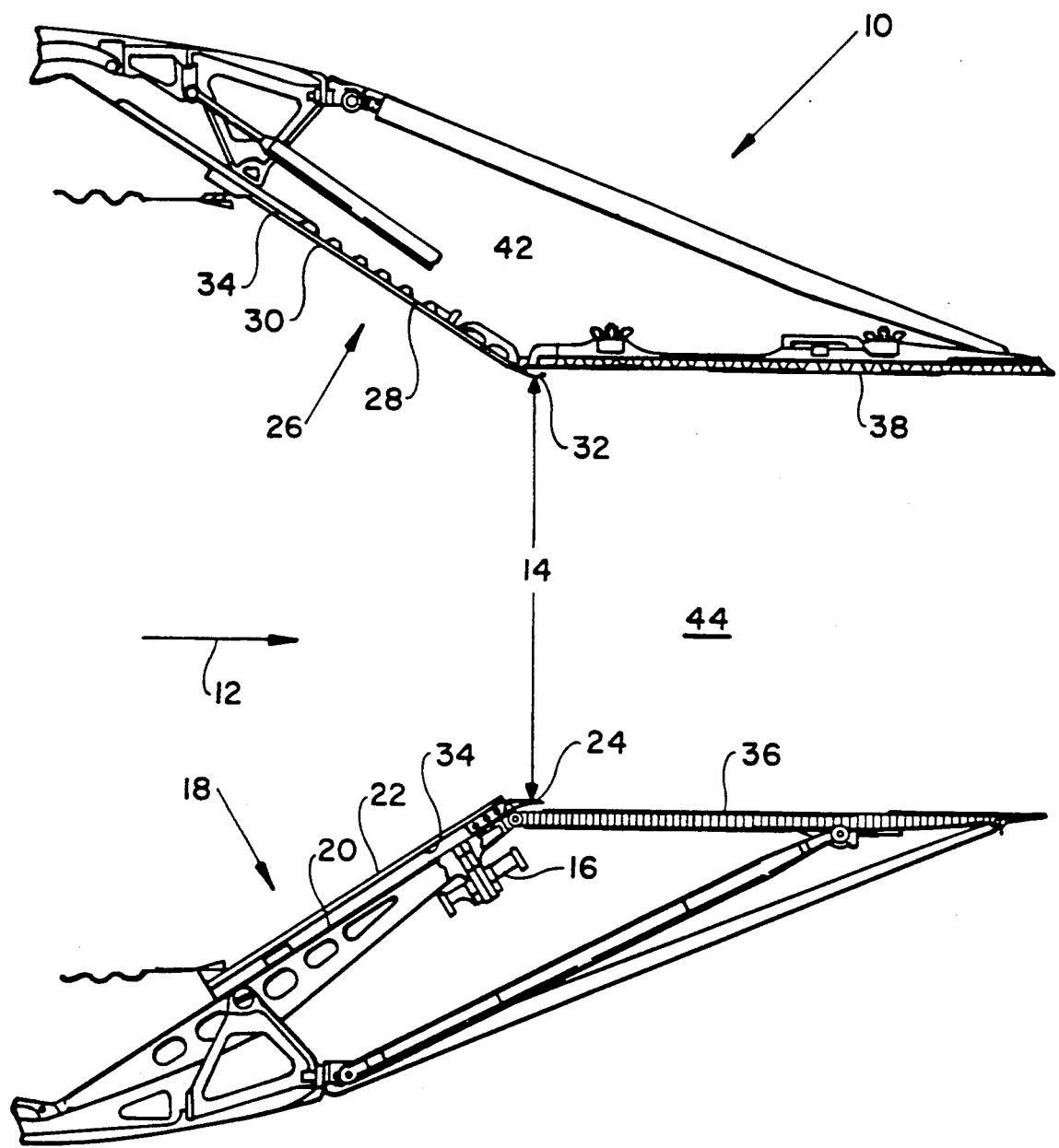
FIG. 1 is a section through a nozzle showing flaps at the bottom and seals at the top.

Referring to FIG. 1 convergent/divergent nozzle 10 is formed of a plurality of overlapping seal and flap assemblies. Gas flow 12 is passing through the nozzle where throat 14 is variable. Bell crank 16 operates to vary the diameter of the throat 14 and accordingly the flow area through this section.

Figure 2:
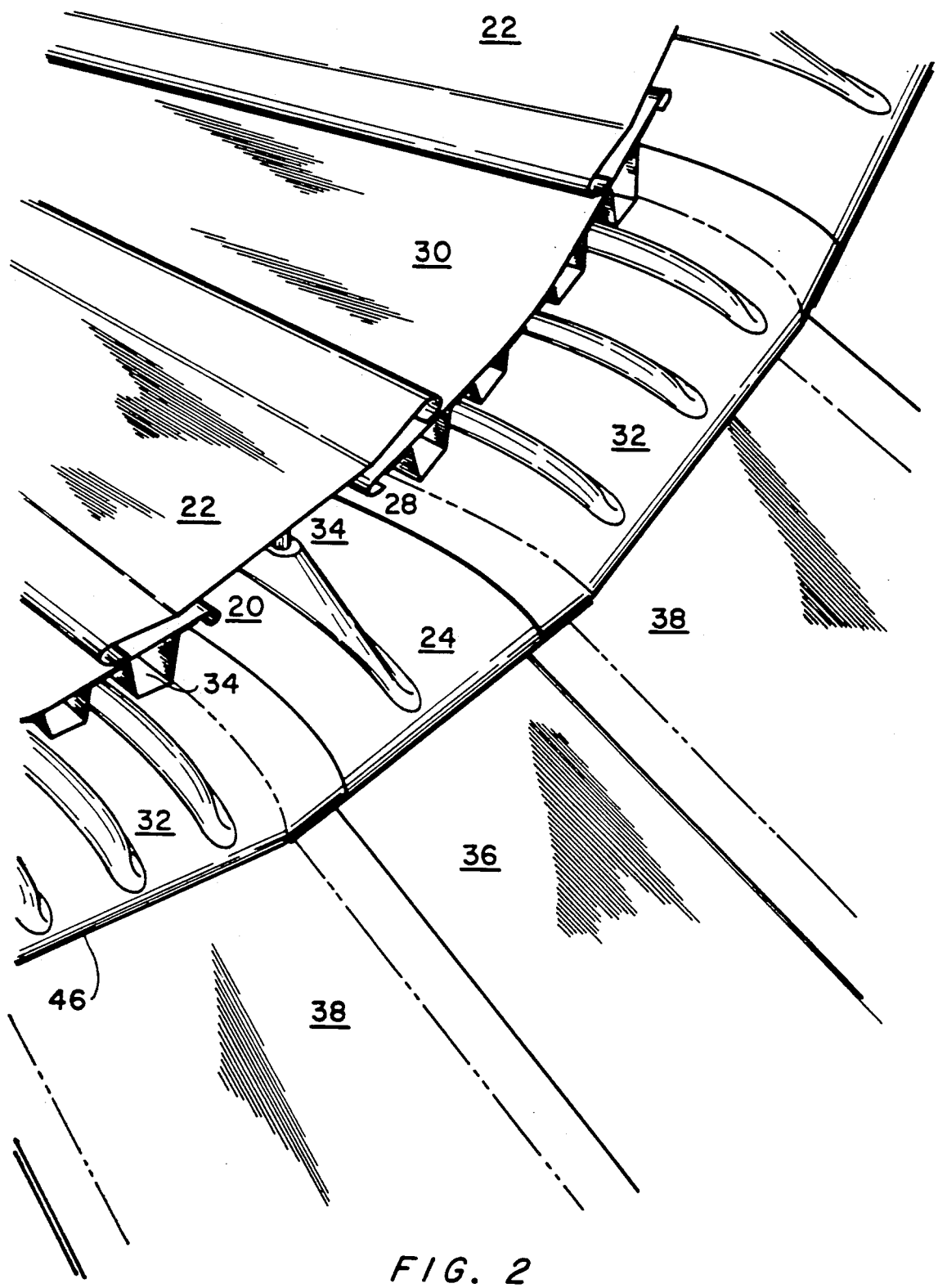
FIG. 2 is an isometric view of the throat area.

Referring also to FIG. 2 each convergent flap assembly 18 is comprised of a convergent flap 20 and a convergent flap liner 22. A cantilevered extension deflector 24 is located on the downstream end of the convergent flap 20.

Convergent seal assembly 26 includes the convergent seal 28 and convergent seal liner 30. A cantilevered extension deflector 32 is located on the downstream edge of the seal.

A forced flow air cooling path 34 passes between each convergent flap and flap liner and between each convergent seal and seal liner. This cooling air flow passes out for film cooling of divergent flaps 36 and divergent seals 38.

In the schematic view shown in FIGS. 4, 5 and 6, there is shown a divergent seal cutout 40 which is explained in more detail later. This cutout is in fluid communication with ambient air plenum 42 and the interior 44 of the nozzle.

Referring to FIG. 4 the maximum throat area position of the nozzle is shown with deflector 32 making contact along line 46 where it touches the divergent seal. The convergent flap cantilevered extension deflector 24 makes similar contact. This contact seals the flow path for any air passing through cutout 40. No cooling air will be induced even if the pressure is below that of the ambient pressure and should the internal pressure be higher than the ambient pressure there will be no back flow of hot gas.

FIG. 5 illustrates the deflectors in the flow nozzle in the intermediate area position. During such operation a negative pressure exists immediately downstream of the throat and cooling air is induced from plenum 42 through opening 40. This adds to the preexisting cooling air passing through the forced flow cooling path 34 to provide additional cooling of the divergent seals and flaps. The deflector at this location ensures that the minimum pressure existing just downstream of the throat will be effective for inducing air flow. Furthermore the overlap deters any intermittent pressure perturbations from causing hot gas to flow outwardly.

FIG. 6 illustrates the minimum nozzle area position. It can be seen that the deflector 32 contributes to a smaller minimum area than would be achieved otherwise with the same kinematic drive arrangement. The deflector 32 does not operate to seal against the passage of air or gas through opening 40 in this position, this being achieved with other structure.

Figure 7:
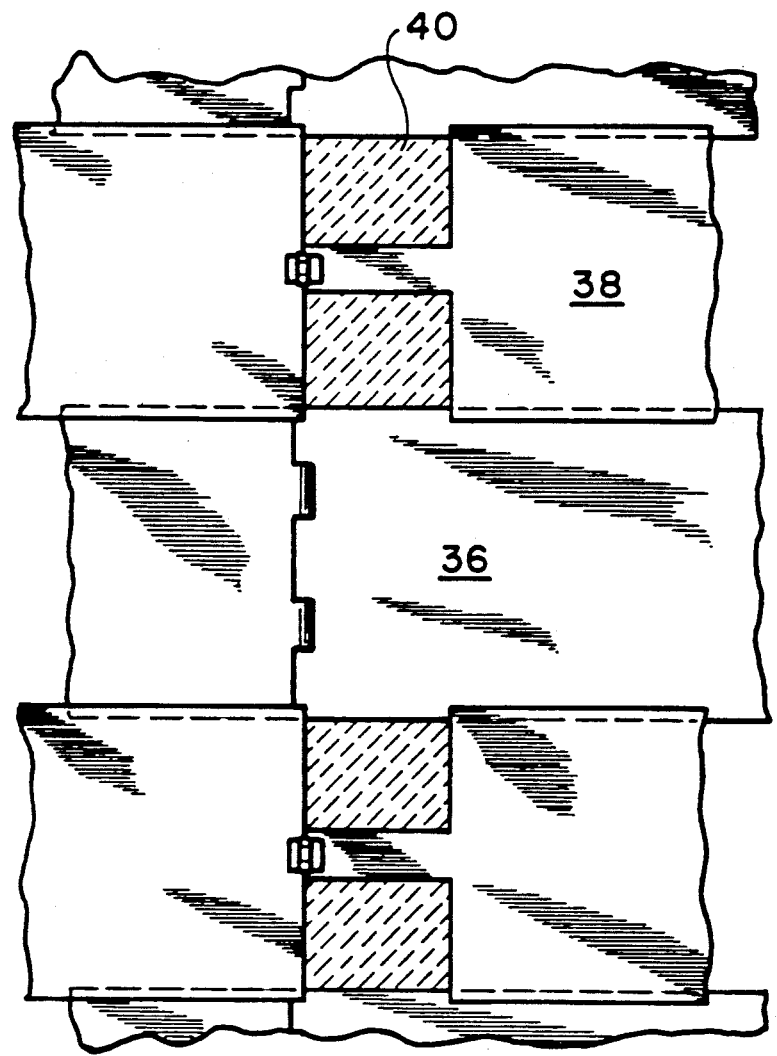
FIGS. 7 and 8 are views showing the divergent seal opening and the overlapping divergent flap.

FIG. 7 illustrates the maximum area position where openings 40 in the upstream outer edges of each divergent seal 38 are shown. These are exposed and not covered by divergent flap 36 so that cooling air may be induced through the openings.

Figure 8:
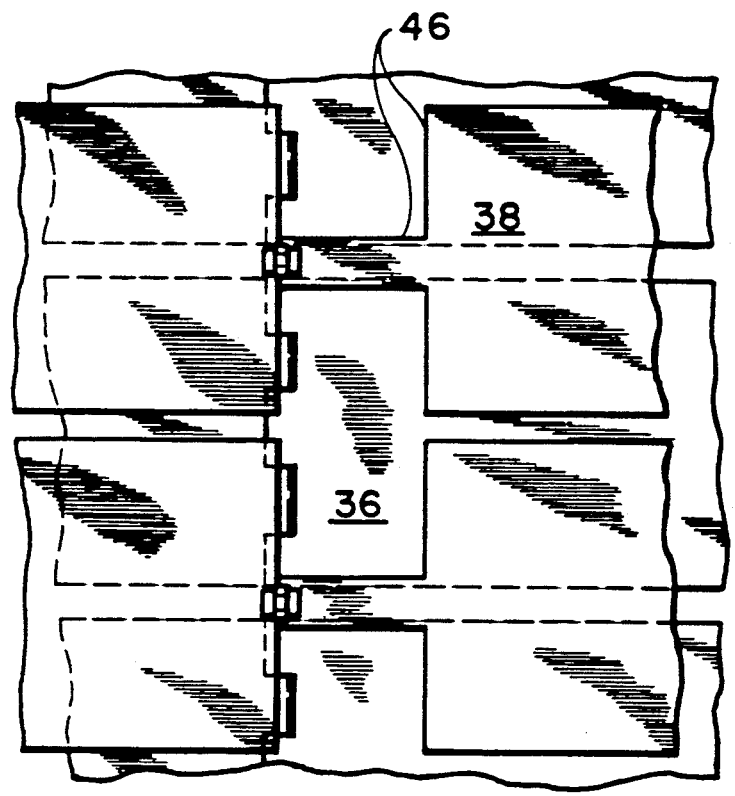

FIG. 8 illustrates the minimum nozzle area position where flaps 36 overlay the openings 40 of the divergent seals 38. Vertical plates 46 located on seal 38 extend toward the divergent flap 36 to achieve full sealing.

I claim:

1. A variable throat convergent/divergent nozzle for a gas turbine engine comprising:
   a plurality of convergent flap assemblies, each flap assembly comprising a convergent flap and a convergent flap liner;
   a plurality of convergent seal assemblies, each seal assembly comprising a convergent seal and a convergent seal liner;
   a plurality of divergent flaps;
   a plurality of divergent seals;
   a variable diameter throat formed at the junction of said convergent flaps and seals and said divergent flaps and seals, variable from a minimum area to an intermediate area and to a maximum area;
   a forced flow cooling path through convergent flap liners;
   a forced flow cooling path through said convergent seal liners;
   an ambient air plenum surrounding said plurality of flaps and seals;
   a plurality of openings in the outer edges of the upstream end of said divergent seals in fluid communication with the interior of said nozzle and with said plenum; and
   said divergent flaps overlaying said plurality of openings in the minimum throat area position, but exposing said openings in the intermediate throat area position.

2. A variable throat convergent/divergent nozzle for a gas turbine engine comprising:
   a plurality of convergent flap assemblies, each flap assembly comprising a convergent flap and a convergent flap liner;
   a plurality of convergent seal assemblies, each seal assembly comprising a convergent seal and a convergent seal liner;
   a plurality of divergent flaps;
   a plurality of divergent seals;
   a variable diameter throat formed at the junction of said convergent flaps and seals and said divergent flaps and seals, variable from a minimum area through an intermediate area to a maximum area;
   a forced flow cooling path through said convergent flap liners;
   a forced flow cooling path through said convergent seal liners;
   a cantilevered extension deflector on each convergent flap;
   a cantilevered extension deflector on each convergent seal;
   said cantilevered extension deflectors on each flap and seal in contact with said divergent flap an seals when said throat is at said maximum area and not in contact with said divergent flaps and seals when said throat is at said intermediate and said minimum areas.

3. A nozzle as in claim 2 comprising also:
   an ambient air plenum surrounding said plurality of flaps and seals; and
   a plurality of openings in the outer edges of the upstream end of said divergent seals in fluid communication with the interior of said nozzle and with said plenum; and
   said plurality of openings located upstream of the line of contact between said cantilevered deflector and said divergent flaps and seals.

4. A nozzle as in claim 3, comprising also:
   said divergent flaps overlaying said plurality of openings in the minimum throat area position, but exposing said openings in intermediate throat area positions.

* * * * *